United States Patent
Raghupatruni et al.

(10) Patent No.: US 11,295,089 B2
(45) Date of Patent: Apr. 5, 2022

(54) DYNAMICALLY ENHANCING AN INSTRUMENT USING MULTI-STEM DEFINITIONS

(71) Applicant: International Business Machines Corporation, Armonk, NY (US)

(72) Inventors: Nagesh Raghupatruni, Akkayyapalem (IN); Narendra Reddy Tippala, Gajuwaka (IN); Saraswathi Sailaja Perumalla, ChinnaWaltair (IN); Krishna Reddy Venkata Batchu, Resapuvanipalem (IN); Sreedhar Rao Bachu, Devon, PA (US)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 16/805,806

(22) Filed: Mar. 1, 2020

(65) Prior Publication Data

US 2021/0271820 A1  Sep. 2, 2021

(51) Int. Cl.
 *G06F 40/30* (2020.01)
(52) U.S. Cl.
 CPC .................................. *G06F 40/30* (2020.01)
(58) Field of Classification Search
 CPC ....................................................... G06F 40/30
 See application file for complete search history.

(56) References Cited

U.S. PATENT DOCUMENTS

| | | | |
|---|---|---|---|
| 5,237,502 A | 8/1993 | White et al. | |
| 6,311,190 B1 | 10/2001 | Bayer et al. | |
| 6,823,313 B1 * | 11/2004 | Yuchimiuk | G10L 15/22 704/257 |
| 6,910,004 B2 | 6/2005 | Tarbouriech et al. | |
| 7,937,265 B1 | 5/2011 | Pasca et al. | |
| 9,729,533 B2 * | 8/2017 | Snelling | G06F 21/316 |
| 2006/0106595 A1 | 5/2006 | Brockett et al. | |
| 2006/0230035 A1 * | 10/2006 | Bailey | G06F 16/3322 |
| 2007/0038609 A1 | 2/2007 | Wu | |

(Continued)

OTHER PUBLICATIONS ip.com, "Computer Generation of Natural Language From a Deep Conceptual Base", pub. No. 000150594D (2007).

(Continued)

*Primary Examiner* — Kevin Ky
(74) *Attorney, Agent, or Firm* — Anthony V.S. England; Jeffrey S. LaBaw; Susan M. Maze

(57) ABSTRACT

An instrument such as an assessment or survey is enhanced using multi-stem definitions to allow a respondent to request alternative versions of a question. The rephrase item is formulated using a rephrase engine which accesses a bank having preexisting rephrases that are equivalent to phrases found in the instrument. The candidate selects a particular complexity level for the rephrase such as simple or elaborate. Rephrasing can be provided automatically based on a timer for answering the item. The system may set a maximum number of allowable rephrases. An analytical engine can be utilized in conjunction with the present invention to analyze requests from multiple candidates. This analysis may show that a particular item is difficult to understand, and the engine can correspondingly suggest to a moderator of the instrument that it be modified by replacing the particular item with a rephrase item.

20 Claims, 5 Drawing Sheets

(56) References Cited

U.S. PATENT DOCUMENTS

| | | |
|---|---|---|
| 2010/0010803 A1 | 1/2010 | Ishikawa et al. |
| 2011/0153387 A1 | 6/2011 | Ma |
| 2014/0108095 A1 | 4/2014 | Tetreault et al. |
| 2016/0179939 A1 | 6/2016 | Levas et al. |
| 2016/0370954 A1 | 12/2016 | Burningham et al. |
| 2018/0107879 A1* | 4/2018 | Laput .................. G06F 3/01 |
| 2019/0362642 A1* | 11/2019 | Dhamecha ............. G06F 40/20 |
| 2020/0242642 A1* | 7/2020 | Thimsen ................ G06F 16/36 |
| 2020/0356630 A1* | 11/2020 | Silverstein ............. H04L 51/02 |

OTHER PUBLICATIONS ip.com, "Question Formation Enhancement", pub. No. 000223766D (2012).

* cited by examiner

DYNAMICALLY ENHANCING AN INSTRUMENT USING MULTI-STEM DEFINITIONS

BACKGROUND OF THE INVENTION

Field of the Invention

The present invention generally relates to systems that have question-like items and corresponding answer options (instruments), and more particularly to a method of enhancing an instrument in real-time by allowing a candidate to obtain rephrased item stems.

Description of the Related Art

There are a wide variety of instruments like surveys, assessments, tests, questionnaires and polls, that can be used to evaluate a person's potential skills, knowledge, opinions, etc. These instruments consist of items such as questions or other statements that are question-like according to the context. Instruments can be quite complicated, and the science of instrument creation has become very advanced. Well-written questions yield scores that are more appropriate in evaluating a respondent, for example, the extent to which a student has achieved educational objectives, or the knowledge base that a candidate for a job position has.

Questions come in many forms. Generally, there are two kinds, open and closed. An open question is one that requires more than a simple "yes" or "no" answer, i.e., it involves an original response formed by the respondent. A closed question is one for which answer options are provided by the test designer, i.e., the respondent must select from a limited number of options. Closed questions are generally preferable in test creation because they can be evaluated automatically since the system knows beforehand which answers are correct, while open questions require an intelligent moderator or subject-matter expert to evaluate the appropriateness of a response. Whether open or closed, a question or other instrument item has a stem, that is, a main part of the item that represents the problem to be solved, the core question, or an incomplete statement to be completed.

Within the category of closed questions, there are additional question types such as true/false (binary answer), agree/disagree (with a possible range in agreement or disagreement) and multiple choice. Multiple choice questions can further be of various sorts including single correct answer, multiple correct answers, best answer, or negative answer (e.g., "which answer below is not correct?").

Extensive guidelines have been published to help make test and survey questions easier to understand. For example, questions should avoid bias or stereotyping, a stem should ask only one question, and answer options should be homogeneous. Homogenous answers are those which are presented with grammatic parallelism or whose content is related. The more homogeneous the alternatives, the finer the distinction the respondent must make in order to identify the correct answer.

SUMMARY OF THE INVENTION

The present invention in at least one embodiment is generally directed to a method of dynamically enhancing an instrument by receiving items forming the instrument, presenting a particular one of the items to a candidate, receiving an indication that the candidate desires rephrasing of the particular item, responsively formulating a rephrase item for the particular item, and presenting the rephrase item to the candidate as a replacement for the particular item. The rephrase item can be formulated using a rephrase engine which accesses a rephrase bank having preexisting rephrases that are equivalent to phrases found in the instrument. The indication can include a request for a rephrase of the particular item at a certain complexity level, and the formulating generates the rephrase item at the certain complexity level. For example, the particular item can be presented to the candidate with an option to rephrase the particular item at multiple complexity levels including at least a simple level and an elaborate level. The indication can be inferred by the system from an amount of time passing after presentation of the particular item to the candidate without the candidate providing an answer. The system may set a maximum number of allowable rephrases for any item in the instrument, and the rephrase item is formulated only after determining that a current number of rephrase requests from the candidate for the particular item is not greater than the maximum number of allowable rephrases.

An analytical engine can be utilized in conjunction with the present invention to analyze requests from multiple candidates for rephrasing of items in the instrument. This analysis may show that a particular item is difficult to understand, and the engine can correspondingly suggest to a moderator of the instrument that it be modified by replacing the particular item with a rephrase item.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Candidates taking an assessment or survey should understand exactly what a question is asking, even if they do not know the correct answer. Without adequate understanding of the question, it is difficult for a candidate to provide an appropriate response, possibly leading to inaccurate evaluation of the candidate. This problem is exacerbated when it happens for multiple candidates viewing a question in the same instrument.

In spite of the advancements in test creation, there are a variety of reasons why a question might still be deemed difficult to understand. For example, candidates from various regions may interpret the same question differently (for instance, due to differences in dialect). Also, a question may have originally been devised for a candidate at a certain cognitive level but is now being used in an instrument directed to a candidate at a different cognitive level (higher or lower). Sometimes it may seem like a slight difference in degree, such as when a candidate perceives two correct answers but there is no answer option for both.

It would, therefore, be desirable to devise a method of presenting an assessment or survey which could dynamically adapt to a candidate's needs in order to better understand a question. It would be further advantageous if the method could be leveraged to allow designers to improve the quality of the assessment or survey. These and other advantages are achieved in various implementations of the present invention by dynamically enhancing an instrument using multi-stem definitions. Providing multiple item stem definitions enables the candidate to view one or more rephrased versions of the same question. The candidate can iterate through all the rephrased versions to better interpret the question and provide a correct response. Rephrasing can provide different complexity levels of the question, as well as different languages. If a candidate is taking a long time to answer a question, the rephrase feature can automatically be invoked. Rephrasing also allows different versions of the same question (e.g., randomized versions) to be presented so that no two candidates can see the same version. In the preferred embodiment, analytics are applied to further identify any items of an instrument which were frequently rephrased by candidates, and suggest appropriate action that content authors can take to create a superior item set for the instrument.

Figure 1:
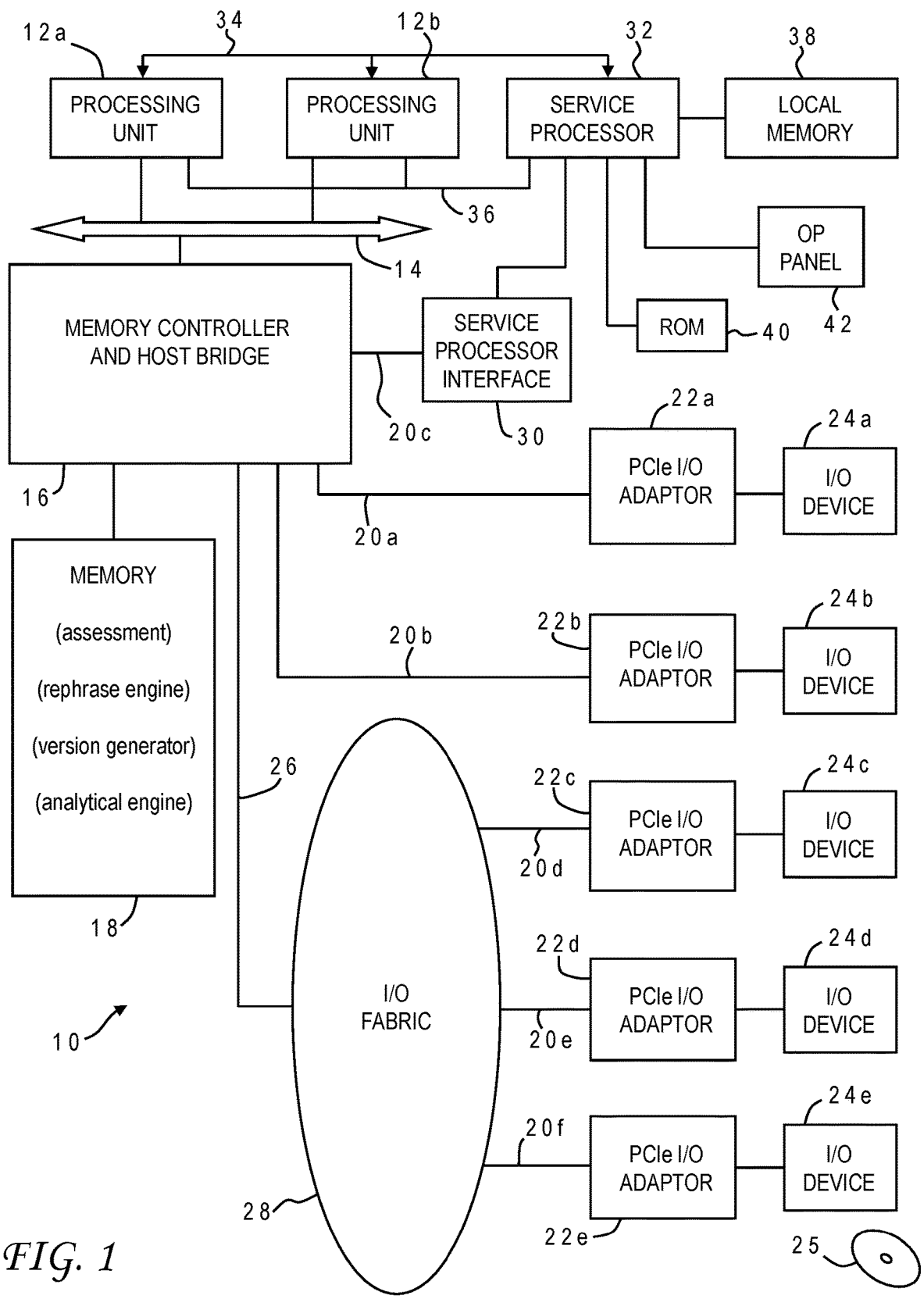
FIG. 1 is a block diagram of a computer system programmed to carry out instrument enhancement using multi-stem definitions in accordance with one implementation of the present invention.

With reference now to the figures, and in particular with reference to FIG. 1, there is depicted one embodiment 10 of a computer system in which the present invention may be implemented to carry out dynamic rephrasing of items using multi-stem definitions. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications in accordance with the present invention, such as the assessment or other instrument to be administered, and a rephrase engine, a version generator, and an analytical engine as described further below.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the dynamic rephrasing application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include one or more computer readable storage media collectively having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a dynamic evaluation process that uses novel natural language processing (NLP) techniques and analytical techniques to manage an instrument such as an assessment or survey. Accordingly, a program embodying the invention may additionally include conventional aspects of various assessment or survey tools as well as NLP systems, and these details will become apparent to those skilled in the art upon reference to this disclosure.

Figure 2:
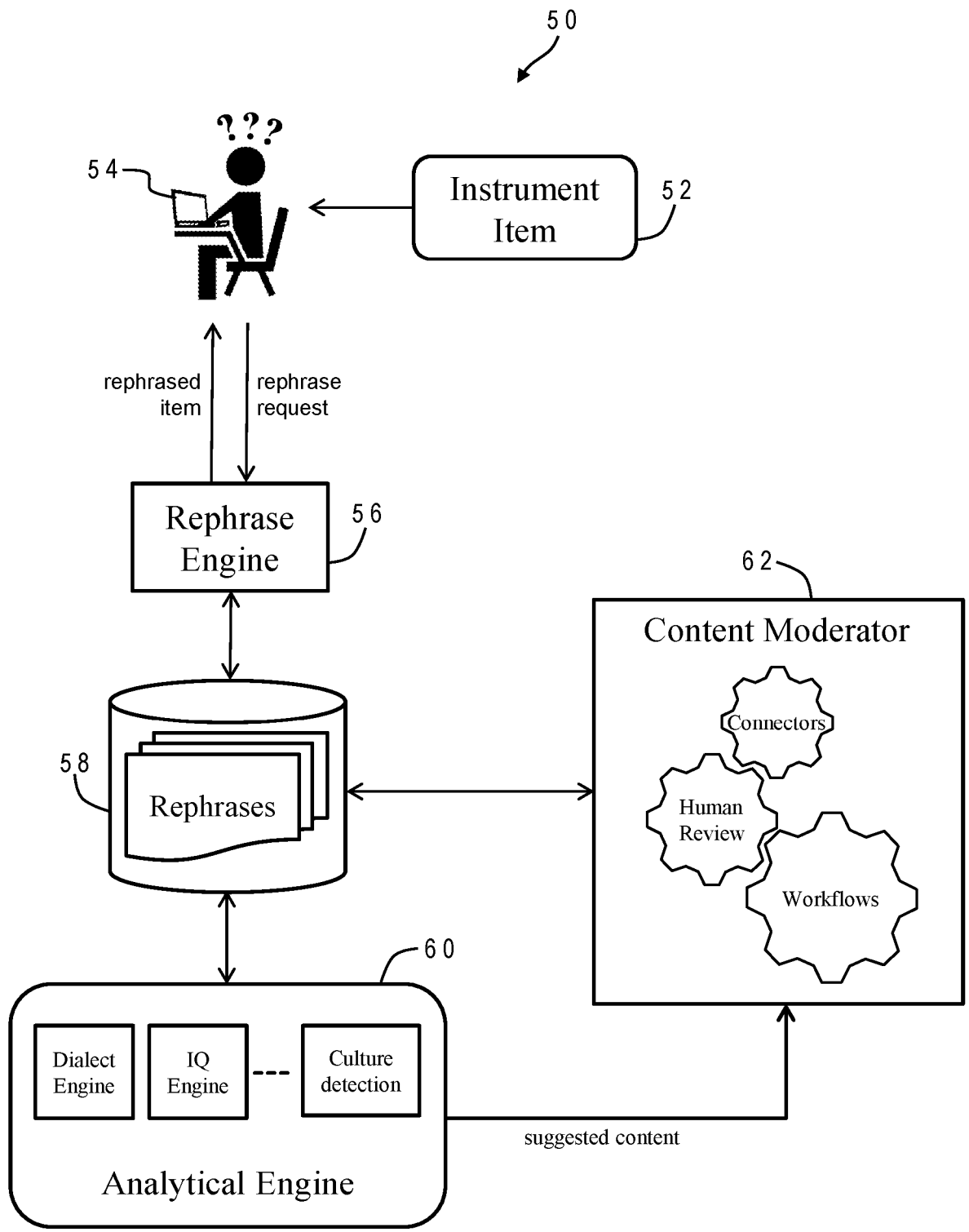
FIG. 2 is a high-level pictorial diagram of a system for dynamically providing rephrased items to an instrument respondent in accordance with one implementation of the present invention.

Referring now to FIG. 2, there is depicted a system 50 for dynamically providing rephrased items to an instrument respondent in accordance with one implementation of the present invention. The instrument may be any type of inquiry vehicle including surveys, assessments, tests, questionnaires or polls, so while these terms are conveniently used for exemplary purposes they are not intended to be limiting and may be considered interchangeable in the context of the present invention. A given item 52 in the instrument is presented to the respondent or user 54 via an appropriate user interface of a computing device such as computer system 10 of FIG. 1. As explained further below in conjunction with FIGS. 4A-4B, that user interface can provide a mechanism (such as a graphical button) which allows user 54 to request a paraphrase or rephrase of the item, i.e., a rewording of the question or other statement involved, if the user is having some difficulty understanding the question. This request is received by a rephrase engine 56 which is used to formulate the substitute item. Rephrase engine 56 can in turn rely on a preexisting rephrase bank 58 having a very large number of phrases or terms that can be used a replacements for other phrases or terms. In this regard, it is possible to use a predefined equivalent phrase as just a piece of the item stem or as a replacement for the entire stem. Likewise, multiple rephrases from bank 58 may be used in different permutations as substitutes for respective pieces of the stem to arrive at a new item. Rephrase engine then provides the substitute item to user 54 who can attempt to answer it as rephrased. Alternatively, user 54 can request a further rephrasing of the item and repeat the building of another substitute item. In the preferred implementation, the alternative stem definitions are heterogeneous, that is, they include different content. One example of heterogeneous stems can be found in the context of hiring a candidate for a particular job. If a candidate mentions she has knowledge on Spring Boot framework in her resume (Spring Boot is a Java-based framework used to create a micro-service) and the system further detects that the purpose of hiring is to work as a Grails3 programmer (Grails is a web application framework built on top of Spring Boot) then the system can present Grails3 version questions as it is built on top of Spring Boot. This enables the administrator to evaluate the candidate in the context of her skill set as it matches project requirements.

The rephrases in bank 58 are semantically equivalent to other phrases that might be found in common speech or in a vernacular peculiar to the particular instrument being administered, and may be stored as a table or database for quick lookup. The equivalent phrases can be manually curated, can be obtained from lists of simple word substitutes, or can be obtained via natural language processing capabilities, or some combination of the foregoing. Natural language processing (NLP) is a field of computer science, artificial intelligence, and linguistics concerned with the interactions between computers and human (natural) languages. Many challenges in NLP involve natural language understanding, that is, enabling computers to derive meaning from human or natural language input, and others involve natural language generation allowing computers to respond in a manner familiar to a user. One example of an advanced computer system that uses natural language processing is the Watson Discovery services available from International Business Machines Corp. Those services can extract metadata from original text such as entities, keywords, categories, sentiment, emotion, relations, and syntax. This metadata is used along with identified patterns, trends, and insights from unstructured data to generate the equivalent phrases according to conventional methodologies, and persist it in the data bank. The system can further consider the context of an item based on features such as images, audio, video or a format (e.g., numerical) of questions. An administrator or moderator can have privileges to validate and modify the bank at any point of time. While the rephrasing is dynamically performed, that is, in real-time at the user's request, the equivalent phrases are preferably banked previous to administration of the instrument, i.e., scheduled offline to avoid the load on the system. Nevertheless, the equivalent phrases could themselves be constructed on-the-fly if needed, from corpora related to the focus of the particular instrument at hand.

In this implementation system 50 further includes an analytical engine 60 that periodically scans the rephrase requests and generated rephrases, and provides feedback regarding rephrasing for this instrument to a content moderator 62. The analysis can be based just on the requests from this user 54 or from multiple users responding to the same instrument. The feedback can include suggested content for modifying an item in the instrument or for other rephrases to be added to rephrase bank 58. For example, analytical engine 60 may note that a particular item was requested to be rephrased many times by multiple users indicating that this item requires attention. Analytical engine 60 might further determine that this specific item no longer required rephrasing once a particular rephrase had been employed, e.g., all users were able to respond to an item once the rephrase "Asia Minor" was substituted for "Anatolia", and so suggest that the instrument be modified to present the item originally (in the future) with the phrase "Asia Minor". Alternatively, or additionally, analytical engine 60 can use NLP to further analyze an item that has been repeatedly requested to be rephrased and come up with an entirely new version of the item, which is then forwarded to content moderator 62. If an item is being opted for a lower difficulty level by many users then that level should be presented at the outset.

In some implementations, analytical engine 60 considers whether a phrase in a problematic item might be time-sensitive and whether a better phrase would be appropriate because of a change in the temporal perspective of the user. This situation is referred to as depreciation. For example, the item might be asking which country's capital city is Yangon which is the name of the old capital of Myanmar, but that country moved its capital to the city of Naypyitaw in November of 2005. Analytical engine 60 can accordingly suggest that the item in the original instrument be changed to reflect this update. As a further example in a technical field, an application program interface (API) for a software program might have changed due to a new version release of the program, and in such a scenario the analytical engine could identify changes in nomenclature in the new version and generate new equivalent phrases on-the-fly. In some implementations these rephrases can be added to rephrase bank 58 immediately, i.e., without moderator approval.

Analytical engine 60 can further analyze an item in various ways to suggest other changes. In an exemplary embodiment, analytical engine 60 has a variety of modules including a dialect engine, an IQ (intelligence quotient) engine, and culture detection. The dialect engine can infer that a particular dialect or other regional variation of a term or phrase may be more appropriate based on various information, such as demographic data about user 54 which is uploaded into system 50 by user 54 via a prefatory questionnaire to the instrument. The IQ Engine can discern when a question needs administration attention for the next phases of assessment composition based on majority of items or questions that are being opted to rephrase by users of different cognitive levels. The culture detection can infer cultural language biases from the demographic data or a known geographical location where the candidate is taking the assessment or survey.

Any of rephrase engine 56, rephrase bank 58 and analytical engine 60 could be located on the same computer system used to present the instrument items to user 54 or, alternatively, any or all of them could be deployed at a remote location like a cloud server accessed via a network such as the Internet.

Figure 3A:
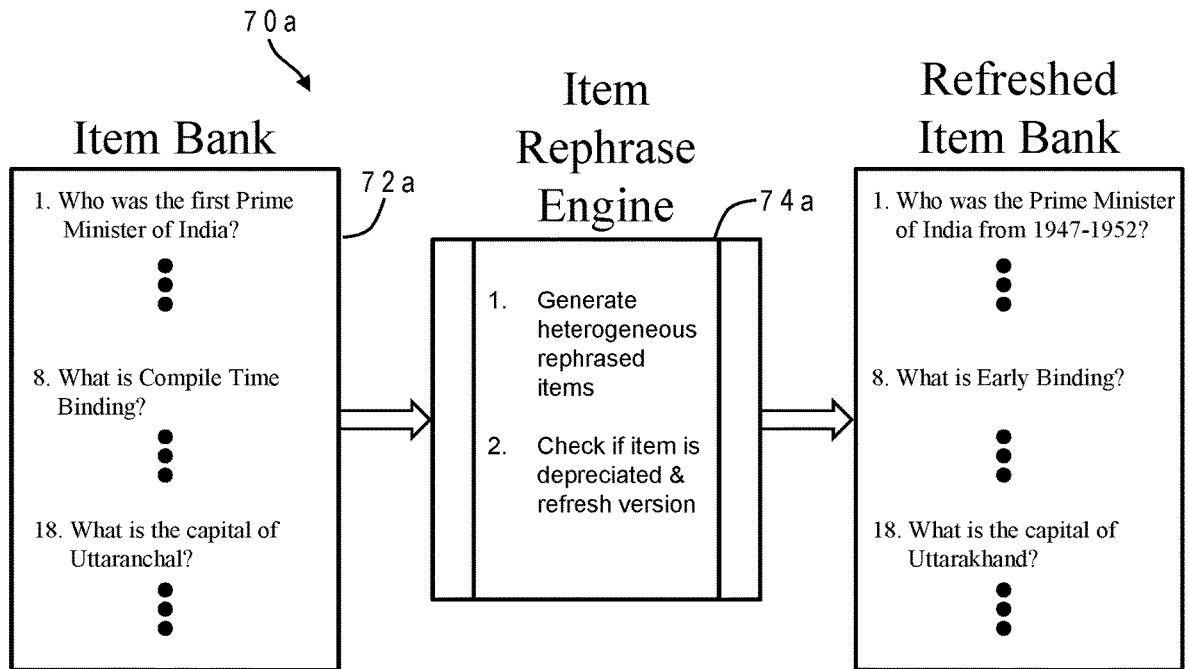
FIGS. 3A and 3B are block diagrams illustrating item and response rephrase workflows with examples for three questions and corresponding answers in accordance with one implementation of the present invention.
Figure 3B:
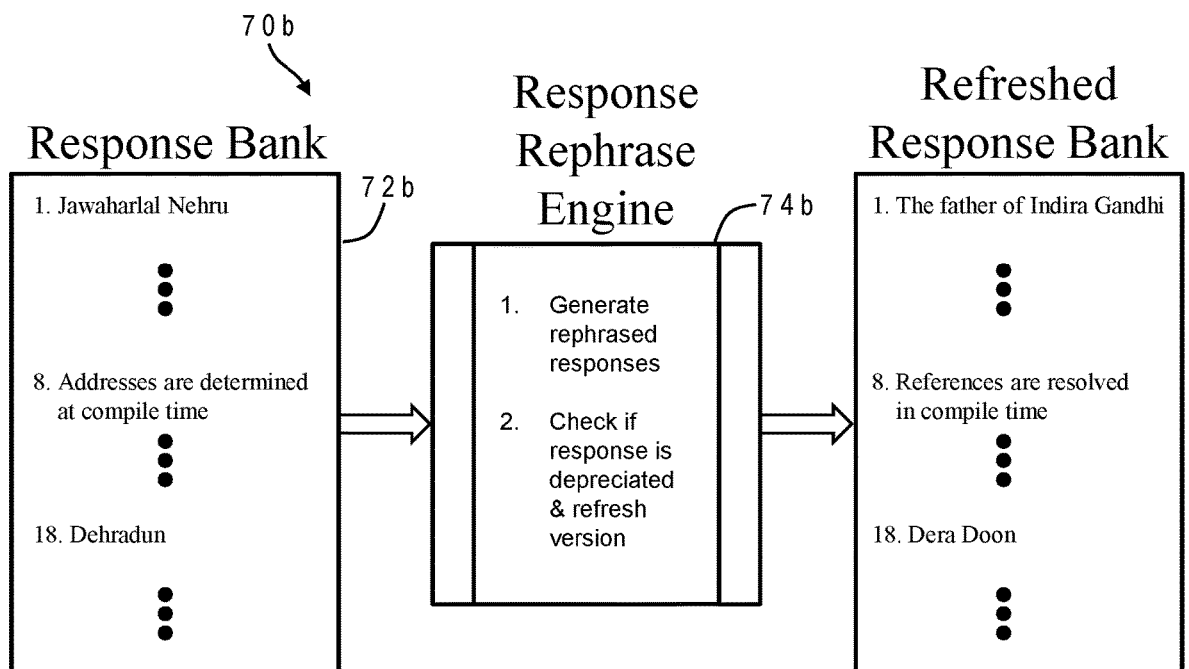

In another implementation where items are open questions, the responses to items in an instrument are rephrased in addition to the items, for purposes of later scoring. FIGS. 3A and 3B show block diagrams for item and response rephrase workflows 70a, 70b in such an implementation. Item rephrase workflow 70a provides examples for rephrasing of three different questions. Those questions are contained within an item bank 72a as part of the instrument. Each question is processed by an item rephrase engine 74a similar to rephrase engine 56. Item rephrase engine 74a can generate rephrased items and additionally check to see if any item is depreciated and, if so, refresh the version. Item rephrases from item rephrase engine 74a are then stored in refreshed item bank 76a. Further to this example, the first question in the instrument is "Who was the first Prime Minister of India?". Item rephrase engine 74a determines from its knowledge base that the first prime minister of India served from the years 1947 through 1952 and so generates an equivalent phrase based on this time period. This question has accordingly been rephrased as "Who was the Prime Minister of India from 1947-1952?" in refreshed item bank 76a. Another question in the instrument is "What is Compile Time Binding?". Item rephrase engine 74a finds a reference document noting that compile time binding is also known as early binding, and so rephrases the item as "What is Early Binding?". Another question in the instrument is "What is the capital of Uttaranchal?". Item rephrase engine 74a finds in another reference document a text fragment saying "Uttarakhand, formerly known as Uttaranchal, . . . ", and concludes that this item has depreciated, so it may be rephrased by simply substituting the new capital name. The resulting rephrased question to be stored in refreshed item bank 76a is "What is the capital of Uttarakhand?".

Response rephrase workflow 70b is similar to item rephrase workflow 70a except that is refers to three exemplary responses for the items rather than the items themselves. The instrument designer provides what are deemed as correct responses for each of the questions in a response bank 72b as part of the instrument. Each response is processed by a response rephrase engine 74b. Response rephrase engine 74b can generate rephrased responses and additionally check to see if any response is depreciated and, if so, refresh the version. Item rephrases from rephrase engine are then stored in refreshed response bank 76b. Further to this example, the provided response to the first question is "Jawaharlal Nehru" (the first Prime Minister of India). Response rephrase engine 74b determines from its knowledge base that Indira Gandhi was Jawaharlal Nehru's daughter, and so crafts a rephrased response "The father of Indira Gandhi" which is stored in refreshed response bank 76b. The provided response for the second question in FIG. 3A (what is compile time binding) is that "Addresses are determined at compile time". Response rephrase engine 74b finds a reference document that talks about resolving references instead of addresses being determined in relation to compile time binding, and so rephrases the response as "References are resolved in compile time". The response for the third question in FIG. 3A (what is the capital of Uttaranchal) is given as "Dehradun". Response rephrase engine 74b determines from another reference document that another name for this city is Dera Doon, and provides this name as a rephrased response to refreshed response bank 76b.

FIG. 3A shows an open question, but those skilled in the art will appreciate that the various features of the present invention can be implemented with other question types. For example, there could be an "agree/disagree" portion of a survey having the statement "Employees are encouraged to participate in making decisions that affect their work", and this statement could be rephrased as "Staff are encouraged to innovate and provide valuable solutions while working on a problem".

Figure 4A:
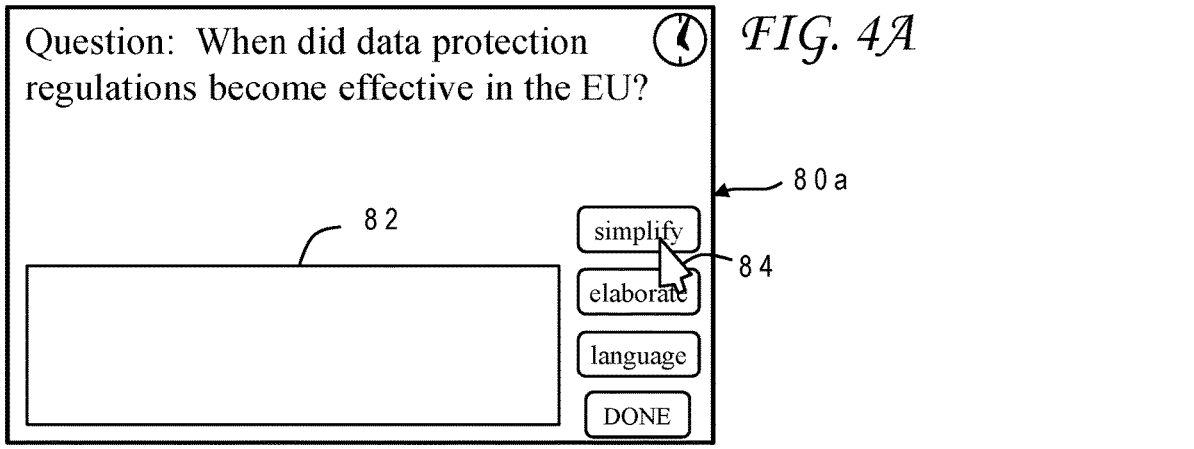
FIGS. 4A-4C are screenshots for a user interface which presents a question to a candidate, demonstrating simplified rephrasing and elaborative rephrasing in accordance with one implementation of the present invention.
Figure 4B:
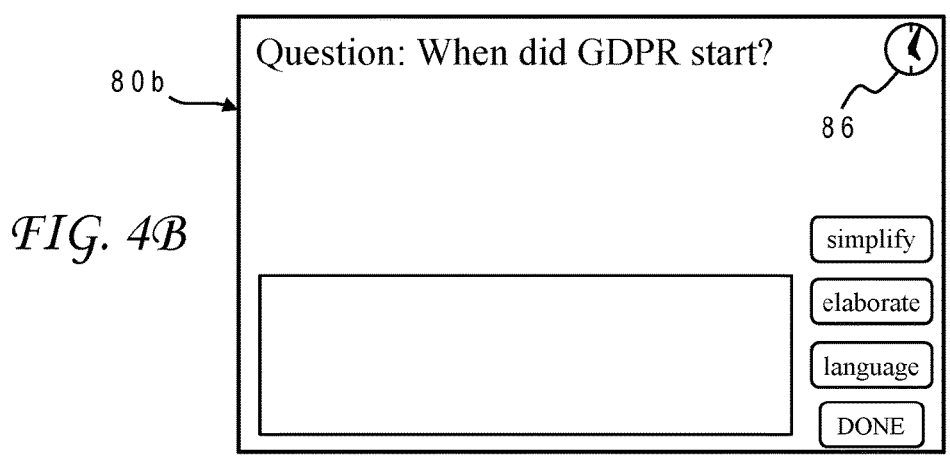
Figure 4C:
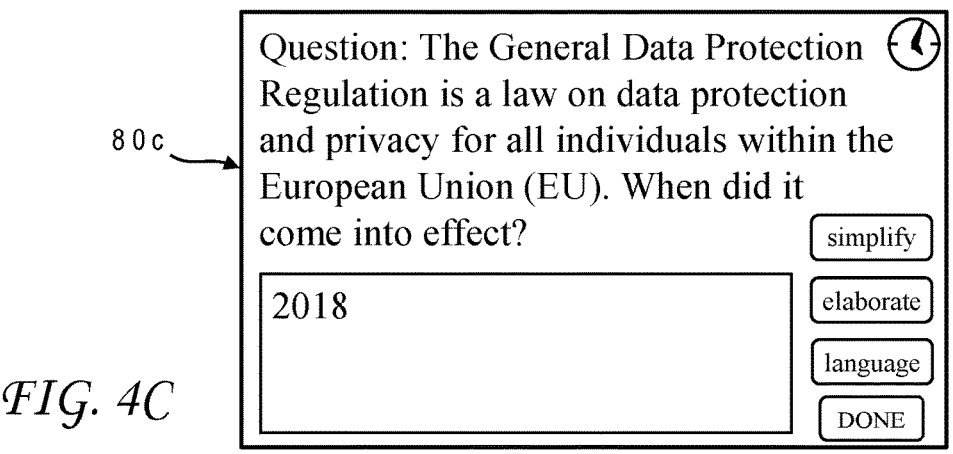

In more advanced implementations, the present invention allows for adjustment of an item when rephrasing according to a user's preference. This adjustment can pertain to various aspects of the item, such as the language in which the item is presented, or the granularity or complexity of the item. For example, there could be three complexity levels of low, medium and high complexity (there could of course be more than three levels, providing a range of simplicity and elaboration in item presentation). In one version of this implementation, the original item is written to represent a medium complexity, and the system offers the user an opportunity to rephrase the item by either simplifying it or by making it more elaborate. Such an embodiment is illustrated by FIGS. 4A-4C which are three screenshots 80a, 80b, 80c for a user interface which presents the items from an instrument to a candidate. FIG. 4A shows the original (medium complexity) question in screenshot 80a as "When did data protection regulations become effective in the EU?". While this item could be presented in closed form, such as a multiple choice question, in this example it is an open question so a box or input field 82 is provided to allow the candidate to type in a response. There are four buttons to the right of the input field 82, a "simplify" button, an "elaborate" button, a "language" button, and a "DONE" button. If the candidate knows the answer to the original question, it can be entered in input field 82 followed by the candidate using a graphical pointer 84 of the user interface (e.g., mouse arrow) to select the "DONE" button. However, if the candidate is having difficulty understanding the question, he can activate one of the other buttons for rephrasing of the question.

Activation of the "language" button results in the user interface providing a dialog box or other input object (not shown) which allows the candidate to select a preferred language from a list. Once so selected, the system regenerates the question using a conventional translation program, and re-presents the translated question to the candidate via the user interface.

If the candidate would like to get a less complicated form of the question, the "simplify" button is activated. The system will then present a simpler version of the question as seen in the screenshot 80b of FIG. 4B. Here the question has been reduced to "When did GDPR start?". Even though this question is put much simpler than that in FIG. 4B, it may be that the candidate did not understand what was meant by "data protection regulations" in the original question but is familiar with the acronym "GPDR" and can now answer the question.

If the candidate would instead like to get a detailed form of the question, the "elaborate" question is activated. The system will then present a more complex version of the question as seen in the screenshot 80c of FIG. 4C. Here the question has been become "The General Data Protection Regulation is a law on data protection and privacy for all individuals within the European Union (EU). When did it come into effect?". Further to this example, the candidate fully understands the rephrased question and provides the correct answer of "2018" in input field 82.

The complexity of alternative stems can be gauged in a variety of manners. Different rephrases can be automatically generated as described above, and the content moderator can manually assign a complexity level to each version of an item. Alternatively, a natural language classifier can be used to classify each version according to complexity level. A rules-based system can also be used, e.g., a simple word count being used as a basis for complexity level, i.e., different thresholds for the number of words in the rephrase.

In implementations where more than three levels of complexity are provided, a candidate can activate the simplify or elaborate buttons repeatedly, to progressive move toward the simplest form of the item or toward the most complicated form of the item. This feature can be combined with other features available in the various implementations of the present invention. For example, it can be combined with the language button. A candidate might first activate the "language" button to select a different language from that originally presented, and in addition to a translation of the question the "simplify" and "elaborate" buttons can also change their labels based on the selected language. Then the candidate could activate the "elaborate" button and a more complicated version of the question would be presented in the selected language. The system could also allow for rephrasing at the same complexity level already selected. In other words, a candidate could request an elaborate version of the question, and then request further rephrasing of that elaborate version without a further increase in complexity.

In some implementations the need for rephrasing of an item can be inferred by the system from a timer 86 which keeps track of how long it is taking for the candidate to provide an answer (i.e., hit the "DONE" button). In some versions of this implementation, if a preset time passes then the system automatically generates a rephrase and presents the substitute item to the candidate without any explicit request. Alternatively, the timer can lead to a prompt presented to the candidate such as "Would you like me to rephrase the question?" and highlight one or more rephrase buttons of the user interface.

Figure 5:
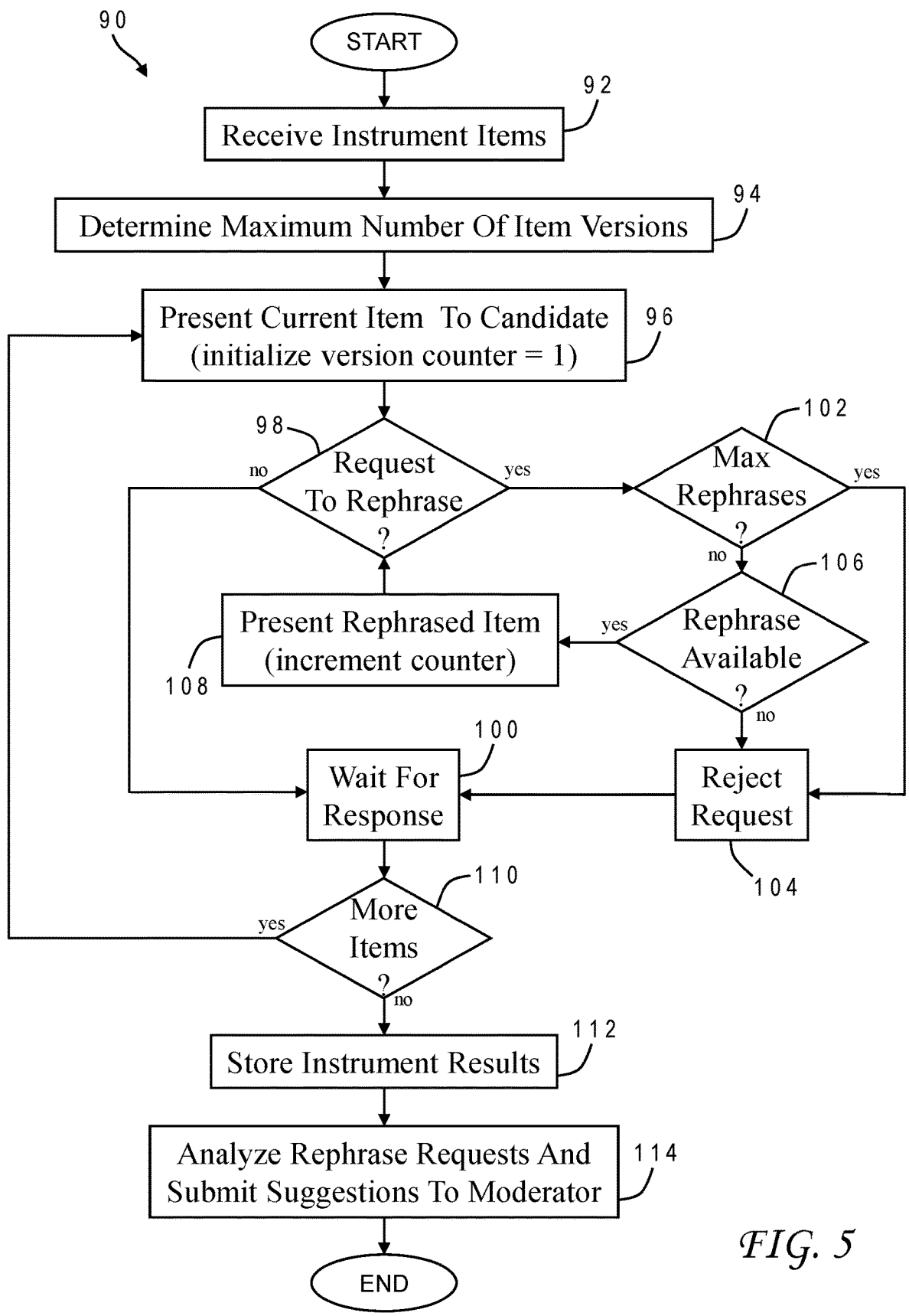
FIG. 5 is a chart illustrating the logical flow for a dynamic evaluation process which provides selective rephrasing of questions in accordance with one implementation of the present invention.

The present invention may be further understood with reference to the chart of FIG. 5 which illustrates the logical flow for a dynamic evaluation process 90 in accordance with one implementation of the present invention. Process 90, which may be carried out on any computing device such as computer system 10, begins with receipt of the instrument having multiple items 92. The dynamic rephrasing system determines a maximum number of item versions to be allowed for the evaluation 94. This determination may depend upon a variety of factors according to the system designer, and can be implemented by the analytical engine as needed. For example, different quantities of available rephrases may be desirable according to historical usage metrics for a given assessment. If a test is used for technical level evaluation or for candidates having a vast range of experience then it might be desirable to allow more versions of an item stem. Also, it may be desirable to provide a larger number of permitted versions if a high number people are taking an assessment, say, one thousand candidates taking the assessment versus only ten candidates. The historical data for these different usages can be used by the analytical engine to predict the optimum numbers of rephrased versions to provide and maintain. In some cases it may desirable to limit the number of times a particular candidate is allowed to rephrase an item which can help avoid cheating that occurs if a candidate is familiar with some, but not all, versions of a question. There also may be time constraints involved in the evaluation that inform toward more or less available versions.

Once the maximum number of item versions is set, the first (or current) item is presented to the candidate 96, and a version counter is initialized to 1 (for this implementation, the original item is considered the first version). The system checks to see if the candidate has requested a rephrase 98. If no request is made, the system waits for the response to the current item from the candidate 100. If a rephrase request is made, the system first checks to see if the candidate has already reached the maximum number of version rephrasing allowed 102, by comparing the version counter to the maximum number of versions allowed. This situation could occur if the candidate has previously requested rephrasing, particularly multiple times. If the maximum number of versions has already been presented, the subject request is rejected 104, and the system again waits for the candidate's response 100. If the maximum number of versions has not been reached, the system checks to see if a rephrase is available 106 according to any attributes that may have been specified by the rephrase request. For example, the candidate may be asking for a more complicated version of the item but there may be none left, i.e., they have been exhausted by previous requests for elaborate rephrases. If no appropriate rephrase is available, the request is again rejected and the system waits for the candidate's response to the item 100. If an appropriate rephrase is available, that rephrase is generated and presented to the candidate as a substitute item 108. The process returns to the decision 98 to allow additional rephrase requests until the process leads to the wait for the response 100. Once the response is received, a check is made to see if there are more items in the instrument to be processed 110. If there are more items, the process repeats iteratively at box 96 with the next item until all items are processed. After the candidate has answered all of the items, the results are stored for later evaluation 112. In the implementation where the system also rephrases responses, an item that is an open question can be considered answered correctly if it matches either the original correct response designated by the instrument designer or a rephrase of the response as provided by the response rephrase workflow of FIG. 3B. The system can then analyze all of the rephrase requests and make any suitable suggestions for changes in the instrument to the content moderator 114.

The present invention in it manifold embodiments accordingly represents an significant improvement to the technical field of instrument creation and deployment. This proposal fills any gaps that might exists between question description versus user understanding. Allowing a user to have a rephrase option imparts a personalized feel to the user and enables positive interaction with the system, as well as increasing the attention of the user. Most importantly, paraphrasing of item stems with various strings will ensure that the best possible answers are procured for the items. This benefit is particularly useful when evaluating users at different levels of experience or education.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the examples provided herein refer to English-language instruments, they are equally applicable to other languages which can also benefit from the results of natural language processing in those languages. It is therefore contemplated that such modifications can be made without departing from the spirit or scope of the present invention as defined in the appended claims.

What is claimed is:

1. A method of dynamically enhancing an instrument comprising:
   receiving a plurality of items forming the instrument, by executing first program instructions in a computer system;
   presenting a particular one of the items to a first candidate, by executing second program instructions in the computer system;
   receiving an indication that the first candidate desires rephrasing of the particular item, by executing third program instructions in the computer system, wherein the indication includes a request by the first candidate for the rephrasing of the particular item;
   responsively formulating a rephrase item for the particular item, by executing fourth program instructions in the computer system;
   presenting the rephrase item to the first candidate as a replacement for the particular item, by executing fifth program instructions in the computer system;
   determining, in response to detecting that the request for the rephrasing of the particular item from the first candidate plus requests for the rephrasing of the particular item by other candidates in addition to the first candidate exceed a first predetermined threshold number, that the particular item is difficult for at least some of the first candidate and the other candidates to understand; and
   transmitting, in response to the determining that the particular item is difficult for at least some of the first candidate and the other candidates to understand, a suggestion to a moderator of the instrument to modify the instrument by replacing the particular item with the rephrase item.

2. The method of claim 1 wherein said formulating includes using a rephrase engine which accesses a rephrase bank having a plurality of preexisting rephrases that are equivalent to phrases found in the instrument.

3. The method of claim 1 wherein:
   the indication includes a request for a rephrase of the particular item at a certain complexity level; and
   said formulating generates the rephrase item at the certain complexity level.

4. The method of claim 3 wherein the particular item is presented to the first candidate with an option to rephrase the particular item at a plurality of complexity levels including at least a simple level and an elaborate level.

5. The method of claim 1 wherein the particular item describes a matter from a first temporal perspective and the rephrase item describes the matter from a second temporal perspective.

6. The method of claim 1 further comprising:
   receiving a maximum number of allowable rephrases for any item in the instrument; and
   determining that a current number of rephrase requests from the candidate for the particular item is no greater than the maximum number of allowable rephrases.

7. The method of claim 1 further comprising:
   determining for a certain phrasing of the particular item that the requests for the rephrasing of the particular item by the first candidate and the other candidates do not exceed a second threshold number; and
   transmitting, in response to the determining for the certain phrasing of the particular item that the requests for the rephrasing of the particular item by the first candidate and the other candidates do not exceed the second threshold number, a suggestion to the moderator of the instrument to modify the instrument by replacing the particular item with the certain phrasing of the particular item.

8. A computer system comprising:
   one or more processors which process program instructions;
   a memory device connected to said one or more processors; and
   program instructions residing in said memory device for dynamically enhancing an instrument by causing the one or more processors to perform a method comprising:
      receiving a plurality of items forming the instrument, presenting a particular one of the items to a first candidate;
      receiving an indication that the first candidate desires rephrasing of the particular item, wherein the indication includes a request by the first candidate for the rephrasing of the particular item;
      responsively formulating a rephrase item for the particular item;
      presenting the rephrase item to the candidate as a replacement for the particular item;
      determining, in response to detecting that the request for the rephrasing of the particular item from the first candidate plus requests for the rephrasing of the particular item by other candidates in addition to the first candidate exceed a first predetermined threshold number, that the particular item is difficult for at least some of the first candidate and the other candidates to understand; and
      transmitting, in response to the determining that the particular item is difficult for at least some of the first candidate and the other candidates to understand, a suggestion to a moderator of the instrument to modify the instrument by replacing the particular item with the rephrase item.

9. The computer system of claim 8 wherein the rephrase item is formulated using a rephrase engine which accesses a rephrase bank having a plurality of preexisting rephrases that are equivalent to phrases found in the instrument.

10. The computer system of claim 8 wherein:
    the indication includes a request for a rephrase of the particular item at a certain complexity level; and
    the formulating generates the rephrase item at the certain complexity level.

11. The computer system of claim 10 wherein the particular item is presented to the first candidate with an option to rephrase the particular item at a plurality of complexity levels including at least a simple level and an elaborate level.

12. The computer system of claim 8 wherein the particular item describes a matter from a first temporal perspective and the rephrase item describes the matter from a second temporal perspective.

13. The computer system of claim 8 wherein said program instructions further cause the one or more processors to perform a method comprising:
receiving a maximum number of allowable rephrases for any item in the instrument; and
determining that a current number of rephrase requests from the candidate for the particular item is no greater than the maximum number of allowable rephrases.

14. The computer system of claim 8 wherein said program instructions further cause the one or more processors to perform a method further comprising:
determining for a certain phrasing of the particular item that the requests for the rephrasing of the particular item by the first candidate and the other candidates do not exceed a second threshold number; and
transmitting, in response to the determining for the certain phrasing of the particular item that the requests for the rephrasing of the particular item by the first candidate and the other candidates do not exceed the second threshold number, a suggestion to the moderator of the instrument to modify the instrument by replacing the particular item with the certain phrasing of the particular item.

15. A computer program product comprising:
one or more computer readable storage media; and
program instructions collectively residing in said one or more computer readable storage media for dynamically enhancing an instrument by causing one or more processors to perform a method comprising:
receiving a plurality of items forming the instrument,
presenting a particular one of the items to a first candidate;
receiving an indication that the first candidate desires rephrasing of the particular item, wherein the indication includes a request by the first candidate for the rephrasing of the particular item;
responsively formulating a rephrase item for the particular item;
presenting the rephrase item to the candidate as a replacement for the particular item;
determining, in response to detecting that the request for the rephrasing of the particular item from the first candidate plus requests for the rephrasing of the particular item by other candidates in addition to the first candidate exceed a first predetermined threshold number, that the particular item is difficult for at least some of the first candidate and the other candidates to understand; and
transmitting, in response to the determining that the particular item is difficult for at least some of the first candidate and the other candidates to understand, a suggestion to a moderator of the instrument to modify the instrument by replacing the particular item with the rephrase item.

16. The computer program product of claim 15 wherein the rephrase item is formulated using a rephrase engine which accesses a rephrase bank having a plurality of pre-existing rephrases that are equivalent to phrases found in the instrument.

17. The computer program product of claim 15 wherein:
the indication includes a request for a rephrase of the particular item at a certain complexity level; and
the formulating generates the rephrase item at the certain complexity level.

18. The computer program product of claim 17 wherein the particular item is presented to the first candidate with an option to rephrase the particular item at a plurality of complexity levels including at least a simple level and an elaborate level.

19. The computer program product of claim 15 wherein the particular item describes a matter from a first temporal perspective and the rephrase item describes the matter from a second temporal perspective.

20. The computer program product of claim 15 wherein said program instructions further cause the one or more processors to perform a method comprising:
receiving a maximum number of allowable rephrases for any item in the instrument; and
determining that a current number of rephrase requests from the candidate for the particular item is no greater than the maximum number of allowable rephrases.

* * * * *